United States Patent [19]

Gagle et al.

[11] 4,308,146

[45] Dec. 29, 1981

[54] CRUSHED RAW OIL SHALE AS OIL SPILL ADSORBENT

[75] Inventors: Duane W. Gagle; Homer L. Draper, both of Bartlesville, Okla.

[73] Assignee: Phillips Petroleum Company, Bartlesville, Okla.

[21] Appl. No.: 792,731

[22] Filed: May 2, 1977

[51] Int. Cl.³ .................... B01D 15/02; B01D 15/06
[52] U.S. Cl. .................... 210/663; 210/671; 210/923; 210/924
[58] Field of Search .......... 210/30 A, 242 S, 242 AS, 210/DIG. 25, DIG. 26, 663

[56] References Cited

U.S. PATENT DOCUMENTS

| | | | |
|---|---|---|---|
| 1,676,151 | 7/1928 | McKee | 210/40 |
| 3,382,170 | 5/1968 | Pope | 210/36 |
| 3,414,511 | 12/1968 | Hitzman | 210/40 |
| 3,464,920 | 9/1969 | Pirson et al. | 210/29 |
| 3,591,494 | 7/1971 | Crouch et al. | 210/40 |
| 3,634,227 | 1/1972 | Patterson, Jr. | 210/11 |
| 3,681,237 | 8/1972 | Orban et al. | 210/30 |
| 3,732,162 | 5/1973 | McCoy et al. | 210/40 |
| 3,749,667 | 7/1973 | Lindstrom | 210/36 |
| 3,753,496 | 8/1973 | Boyd | 210/242 S |
| 3,763,040 | 10/1973 | Timpe et al. | 210/27 |
| 3,798,158 | 3/1974 | Bunn | 210/33 |
| 3,853,767 | 12/1974 | Mohn | 210/DIG. 25 |
| 3,902,998 | 9/1975 | Bertram | 210/40 |
| 4,038,182 | 7/1977 | Jenkins | 210/242 S X |

OTHER PUBLICATIONS

Proceeding of Joint Conference . . . Spills, 3/13-15/73, EPA, API USCG, pp. 333-338.

*Primary Examiner*—S. Leon Bashore
*Assistant Examiner*—F. H. Lander

[57] ABSTRACT

Oil floating on the surface of another liquid is contacted with crushed raw oil shale to adsorb the oil onto the shale. A vortex is created in the surface of the liquid, drawing the crude shale with oil adsorbed thereon beneath the surface of the liquid. The invention provides method and apparatus for adsorbing oil on shale, causing the crude shale with oil adsorbed thereon to sink below the surface of the liquid, recovering the crude shale with oil adsorbed thereon from below the liquid surface, treating the crude shale to separate the oil from the shale, and recycling the crushed shale into contact with oil on the liquid surface.

8 Claims, 2 Drawing Figures

CRUSHED RAW OIL SHALE AS OIL SPILL ADSORBENT

BACKGROUND OF THE INVENTION

This invention relates to removing oil from the surface of another liquid. In one of its aspects this invention relates to adsorbents which are oleophilic and hydrophobic. In another of its aspects this invention relates to mechanical means for causing oil slicks to sink beneath the surface of the liquid upon which they float. In still another of its aspects this invention relates to the recovery of oil from the surface of another liquid.

The recovery of spilled oil from the surface of a body of water has become a major environmental problem. With a large amount of various oils being transported by water routes, the probability of major spillage by accident in transport or transfer from the transporting means has increased dramatically. Contamination of the environment with floating, oily waste has also become a prevalent concern. Although extensive effort has been expended to prevent spillage, leakage, contamination seepage, and other sources by which oil contamination of water surfaces occurs, the problem of removing oily contaminant from the surface of bodies of water still remains.

It is therefore an object of this invention to provide a method and apparatus for removing oil from the surface of other liquids. It is another object of this invention to provide use of an adsorbent material which will agglomerate oil floating on the surface of a liquid and from which the oil can be easily separated. It is still another object of this invention to provide mechanical means for causing an oil slick to be efficiently adsorbed onto an adsorbent material and the combination of materials caused to sink below the surface of the liquid.

Other aspects, objects, and the various advantages of this invention will bcome apparent upon reading this specification, studying the drawing, and the appended claims.

STATEMENT OF THE INVENTION

According to this invention a method is provided for removing oil from the surface of another liquid by contacting the oil with crude raw oil shale, creating a vortex in the liquid on which the crushed oil shale and oil are floating and thereby drawing into this vortex the oil contacted with crushed shale. This causes the crushed shale with oil adsorbed thereon to sink below the liquid surface.

Although it has been found that sprinkling crushed oil shale over the oil floating on the surface of another liquid will cause adsorption of the oil onto the oil shale with eventual sinking of the agglomerated material below the surface of the liquid, a method requiring that a vortex be created and then the crushed oil shale be sprinkled over the surface is preferred because less oil shale is required to sink the oil slick beneath the surface of the other liquid.

In one embodiment of the invention an apparatus is provided for removing oil from the surface of the liquid upon which the oil is floating. The apparatus is a submergible, containing structure which can be a closed structure having an opening in an upward facing wall. This structure is combined with a means spaced in relation with the opening to enable creation of a vortex of liquid within the opening of the structure. Such an apparatus acts as a catch basin for the agglomerated material that sinks beneath the surface of the liquid.

In a preferred embodiment at least a portion of a submerged wall of the containing structure is provided with apertures of size sufficient to pass liquid but sufficiently small to retain crushed oil shale particles with oil adsorbed thereon. This allows circulation of liquid through the containing structure without the possible backflow of agglomerated material that can occur with the only opening being that within which the vortex is created.

In still another embodiment of the invention a method is provided for recovering oil from the surface of another liquid upon which it is floating which entails creating a vortex within the opening of a submergible containing structure such as described above with the containing structure sufficiently submerged so that the opening is situated beneath the surface of the liquid to allow flow of liquid from the surface into the vortex. Crushed oil shale is spread across the floating oil as it is drawn into the vortex. The oil is adsorbed on the oil shale and sinks into the containing structure from which it can be recovered. The recovered agglomerated oil and oil shale can be separated by known methods with recovery of the spilled oil and recycling of the oil shale within this process.

The process of this invention has been found applicable for recovery of any type of oil or oily liquid that can be adsorbed onto a hydrophobic, oleophilic, particulate material. The invention is particularly applicable for recovery of most commercial oils ranging from crude to oil distillates and highly refined materials.

Oil shale which is abundant, readily crushed to a size appropriate for use in this invention, and easily processed for removal of adsorbed oil is the preferred adsorbent for use in this process. It has been found that oil shale sized within a range to pass about No. 4 U.S. sieve (4.76 mm) to about No. 50 U.S. sieve (0.297 mm) is suitable for use in this invention with a preferable sizing between about No. 10 U.S. sieve (2.0 mm) and No. 40 U.S. sieve (0.420 mm). The size of crude material found most useful in the testing of this invention was a material in which 50 percent was sized to pass a No. 10 U.S. sieve and be retained on a No. 20 U.S. sieve, i.e., less than 2.00 mm but more than 0.841 mm in size and 50 percent sized to pass a No. 20 U.S. sieve and be retained on a No. 40 U.S. sieve, i.e., smaller than 0.841 mm but larger than 0.420 mm.

For the purposes of this invention any apparatus that will produce a vortex in the surface of the liquid upon which the oil is floating is suitable for drawing the oil and oil shale beneath the surface of the liquid upon which it is floating. For the purposes of the invention it is sufficient simply to cause the agglomerated material to sink beneath the liquid surface, but since environmental hazards are possible from a combination of oil shale and adsorbed oil settling to the bottom of a body of water, it is at present preferred to provide a means for catching agglomerated material as it sinks beneath the surface of the liquid.

It can readily be seen that any type of enclosing vessel or structure can be used to retain the agglomerated material as it sinks beneath the surface. All that is necessary is to space the means for producing the vortex in interrelation with the containing structure so that the sinking solids are directed to be retained within the structure. The structure can, therefore, best be described as having a base and retaining sides with an opening at the top sufficient for containing the vortex produced. For various uses the structure can be visualized as a permanent installation installed beneath the surface of a treating tank or pond, a structure capable of being attached to buoyant structures and towed into position on open waters, or a containing vessel built onto a vessel that can be moved into position on a body of water. The size of the vessel is dictated only by the size of the supporting structure desired to accomplish removal of a particular amount of floating oil.

Preferably, the containing vessel will include a means of easy access for dumping of collected material. Such means can be a portion of the structure containing apertures of size sufficient to pass liquid but sufficiently small to retain oil particles with oil adsorbed thereon. In large collecting structures a port or removable portion can be included for easy access to the collected material.

The invention can best be visualized in conjunction with the drawing in which

Figure 1:
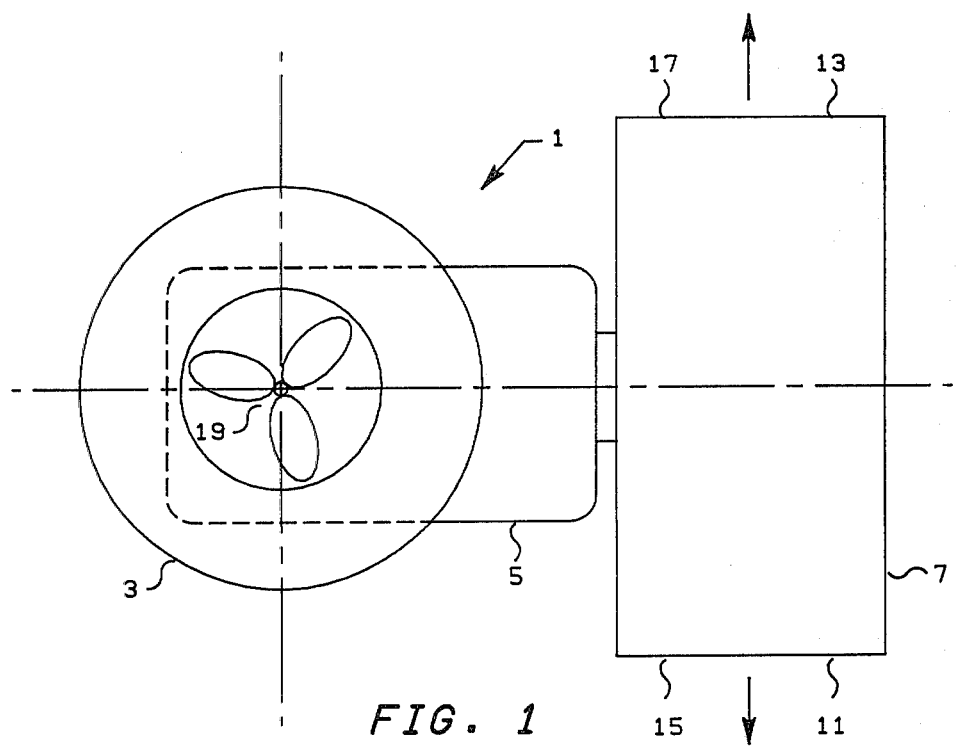
FIG. 1 is a plan of a laboratory apparatus according to this invention.

Referring now to the drawing which will be described using actual experimental procedure used in testing the invention in the laboratory. The experimental apparatus comprised a submergible containing vessel 1 made by fusing together a cylindrical section 3 of plastic tubing having a diameter of about 90 mm connected in open communication with an elbow section 5 which is in turn connected in open communication with a tee section 7 with both the elbow and tee sections having approximately the same working diameter as the cylindrical section. The cylindrical section was open ended 9 and the tee section is open ended 11, 13 with screen elements 15, 17, which can be removable for access to the agglomerated material, contained within the open ends of the tee section. The screens for test purposes were sized to pass particles of No. 30 U.S. sieve size (0.595 mm) and to retain particles of No. 25 U.S. sieve size (0.707 mm). A vertically positioned vary-speed propeller type mixer 19 was positioned in the elbow section to provide a vortex in the cylindrical section of the container.

Crude oil in varying quantities from 0.4 to 3.4 cc's was poured on the water surface 21 to create a film 23. Two crude oils, Prudhoe 26.2° API and Brega 39.6° API, were used as the oil source. The water used was both fresh water and salt solution approximating sea water.

Figure 2:
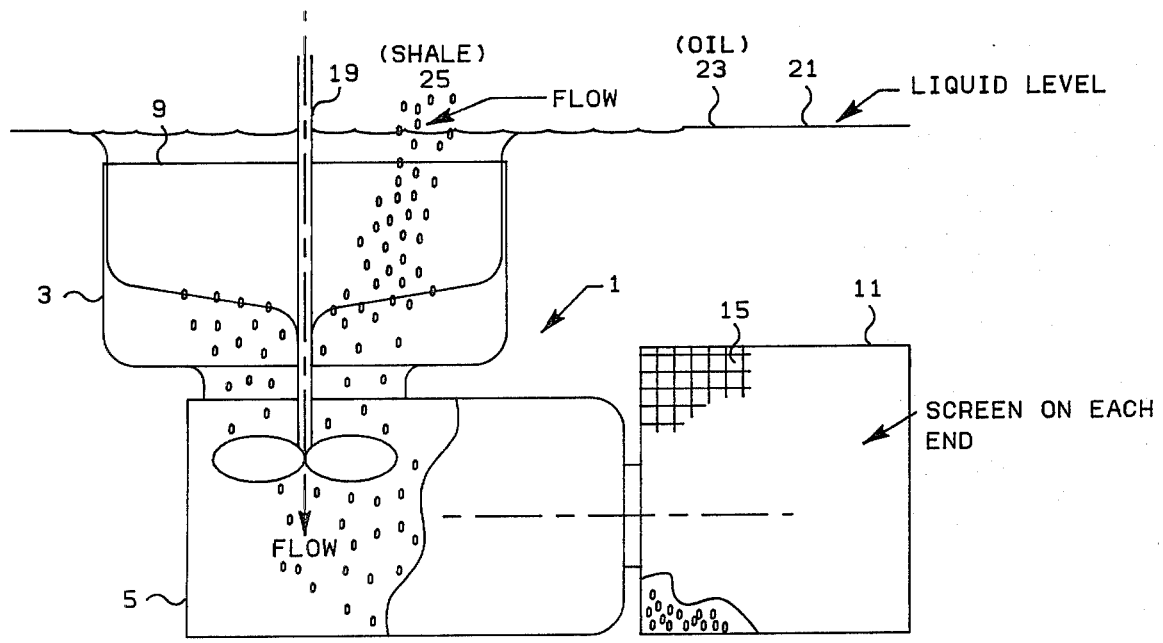
FIG. 2 is an elevation view of the same laboratory apparatus shown in operating relationship with a liquid surface.

Referring to FIG. 2, in the process of the invention the collecting vessel was submerged beneath the surface of the water 21 and the propeller was installed in working interrelation, as described above, in the elbow section of the collecting vessel. The propeller was activated. Oil shale 25 was added at the vortex created by the turning of the propeller with a continuous addition of oil shale crushed to a size of approximately 0.420 mm to 2.00 mm for a period of about 20 seconds. At the end of 20 seconds the water on the surface had circulated through the containing vessel with the oil that had been floating on the surface being contacted with the crushed shale in the vortex agglomerating with the crushed shale and being retained along with the shale in the retaining vessel. At the end of 20 seconds the surface was essentially clear of oil.

We claim:

1. A method for removing oil from a liquid surface upon which said oil floats, said method comprising:
   (a) creating a vortex of the liquid,
   (b) contacting oil drawn into the vortex with crushed raw oil shale, and
   (c) drawing into said vortex the oil contacted with crushed raw oil shale, thereby causing the crushed shale with oil adsored thereon to sink beneath the surface.

2. A method of claim 1 wherein crushed shale is of a size No. 4 U.S. sieve to No. 50 U.S. sieve.

3. A method of claim 1 wherein said crushed shale with oil adsorbed is recovered from below the liquid surface.

4. A method of claim 3 wherein said crushed shale with oil adsorbed is treated to separate the adsorbed oil from the crushed shale.

5. A method of claim 4 wherein crushed shale separated from the adsored oil is recycled into contact with oil on said liquid surface.

6. A method of claim 1 wherein said vortex is created within the opening of a submergible containing structure comprising:
   (1) an opening in an upward facing wall of said structure, and
   (2) a means for creating a vortex of liquid within said opening spaced in interrelation with said opening to enable creation of a vortex, said opening sufficiently beneath the water surface to allow flow of liquid from the water surface into said vortex.

7. A method of claim 6 wherein said vortex is created within the opening of a submergible, containing structure containing apertures of size sufficient to pass liquid but sufficiently small to retain crushed oil shale particles with oil adsorbed thereon.

8. A method of claim 6 wherein said vortex is created within the opening of a submergible containing structure further containing means of access to remove oil shale with oil adsorbed thereon.

* * * * *

UNITED STATES PATENT AND TRADEMARK OFFICE
CERTIFICATE OF CORRECTION

PATENT NO. : 4,308,146
DATED : December 29, 1981
INVENTOR(S) : Duane W. Gagle et al It is certified that error appears in the above—identified patent and that said Letters Patent are hereby corrected as shown below:

Column 4, line 22 of claim 1, delete "adsored" and insert therefor --- adsorbed ---.

Column 4, line 34 of claim 5, delete "adsored" and insert therefor --- adsorbed ---.

Signed and Sealed this

Sixth Day of April 1982

[SEAL]

*Attest:*

GERALD J. MOSSINGHOFF

*Attesting Officer*  *Commissioner of Patents and Trademarks*